United States Patent
Tay et al.

(10) Patent No.: US 11,167,716 B2
(45) Date of Patent: Nov. 9, 2021

(54) REVERSE-WEAKENED PASSENGER AIR BAG DOOR

(71) Applicant: FORD GLOBAL TECHNOLOGIES, LLC, Dearborn, MI (US)

(72) Inventors: Yi Yang Tay, Warren, MI (US); Li Lu, Bloomfield Hills, MI (US); Kenneth J. Kwasnik, Shelby Township, MI (US); Lisandro Trevino, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 305 days.

(21) Appl. No.: 16/267,670

(22) Filed: Feb. 5, 2019

(65) Prior Publication Data
US 2020/0247347 A1    Aug. 6, 2020

(51) Int. Cl.
*B60R 21/205*   (2011.01)
*B60R 21/2165*   (2011.01)
(Continued)

(52) U.S. Cl.
CPC ........ *B60R 21/2165* (2013.01); *B60R 21/205* (2013.01); *B60R 21/216* (2013.01);
(Continued)

(58) Field of Classification Search
CPC . B60R 21/216; B60R 21/215; B60R 21/2165; B60R 21/205; B60R 21/2176;
(Continued)

(56) References Cited

U.S. PATENT DOCUMENTS 6,357,787 B2    3/2002   Lorenz et al.
7,594,674 B1 *  9/2009   Biondo ................. B60R 21/206
                                              280/728.3

(Continued)

FOREIGN PATENT DOCUMENTS

DE    102004058826 A1 *  6/2006   ......... B60R 21/2165
EP       1914125 A1 *    4/2008   ......... B60R 21/2165
FR       3013011 A1 *    5/2015   ........... B60R 21/205

OTHER PUBLICATIONS

Translation of DE102004058826 A1 accessed at www.espacenet.com on Jan. 30, 2021. (Year: 2006).*

*Primary Examiner* — James A Shriver, II
*Assistant Examiner* — Hilary L Johns
(74) *Attorney, Agent, or Firm* — David L. Coppiellie; MacMillan, Sobanski & Todd, LLC

(57) ABSTRACT

An instrument panel for a passenger compartment of an automotive vehicle comprises a molded plastic substrate and a skin covering the substrate. The substrate has inner and outer surfaces, and is adapted to be mounted in the passenger compartment adjacent a windshield. The inner surface is adapted to receive an air bag chute assembly for deploying an air bag. The inner surface is inscribed by a door groove defining a deployment door at least partially tearing open to expel the air bag. The outer surface is inscribed by a hinge groove following a chord path bisecting the outer surface of the deployment door and configured to bend in response to an edge of the deployment door impacting the windshield. The impact force against the windshield is reduced while stiffness of the door against the air bag remains high to facilitate tearing open of the door by the air bag.

13 Claims, 8 Drawing Sheets

(51) Int. Cl.
  *B60R 21/217* (2011.01)
  *B60R 21/216* (2011.01)
  *B60R 21/16* (2006.01)
  *B60R 21/00* (2006.01)
  *B60R 21/215* (2011.01)
  *B60R 21/2338* (2011.01)

(52) U.S. Cl.
  CPC ....... *B60R 21/2176* (2013.01); *B60R 21/2338* (2013.01); *B60R 2021/0004* (2013.01); *B60R 2021/161* (2013.01); *B60R 2021/2161* (2013.01); *B60R 2021/21537* (2013.01)

(58) Field of Classification Search
  CPC ........ B60R 21/2338; B60R 2021/0004; B60R 2021/161; B60R 2021/21537; B60R 2021/2161
  See application file for complete search history.

(56) References Cited

U.S. PATENT DOCUMENTS

| | | | |
|---|---|---|---|
| 7,914,039 B2 | 3/2011 | Mazzocchi et al. | |
| 8,191,924 B2 | 6/2012 | Schupbach | |
| 9,975,514 B1* | 5/2018 | Simon | B60R 21/215 |
| 10,625,702 B2* | 4/2020 | Germain | B60R 21/2165 |
| 2004/0145164 A1* | 7/2004 | North | B60R 21/2165 |
| | | | 280/732 |
| 2009/0134609 A1* | 5/2009 | Onohara | B60R 21/20 |
| | | | 280/728.3 |
| 2009/0256335 A1* | 10/2009 | Reil | B60R 21/2165 |
| | | | 280/728.2 |
| 2011/0062686 A1* | 3/2011 | Buhler | B60R 21/2165 |
| | | | 280/728.3 |
| 2017/0259773 A1* | 9/2017 | Einarsson | B60R 21/2035 |
| 2018/0236697 A1* | 8/2018 | Speckbacher | B29C 45/0017 |

* cited by examiner

REVERSE-WEAKENED PASSENGER AIR BAG DOOR

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to automotive air bag systems, and, more specifically, to a hidden air bag deployment door formed in an instrument panel substrate with bidirectional folding.

Passenger air bag systems are often located behind an instrument panel. During air bag deployment, expansion of the bag ruptures a hidden door in the instrument panel to permit the bag to inflate into an area between the passenger and the instrument panel. A common configuration of an air bag deployment system has a deployment chute supporting an inflator module, the chute having an outer flange bonded to the underside of an instrument panel substrate. The substrate is molded to define inner and outer surfaces and a deployment door region. The deployment door region (which is generally rectangular) is defined by a reduced thicknesses seam along a closed path formed into the inner surface. At least three sides of the door region are sufficiently weakened to tear open during air bag deployment. The tear seam can be formed as part of an initial molding process or can be formed later using a scoring process (e.g., a laser or a hot knife) into the molded substrate. In some instances, the outer surface of the substrate can be trimmed with an outer skin (e.g., leather or elastomeric material), and a foam layer may or may not be injected between the skin and substrate. Corresponding tear seams may also be formed on the inner surfaces of a skin or foam layer.

A typical deployment chute is a one piece molded structure that contains several side apertures into which hooks extending from an air bag module are attached. The air bag module itself is also rigidly attached to vehicle structure such as a cross-car beam. The air bag module contains a folded canvas bag and chemical propellants for inflating the bag on command. The chute typically includes a tubular outer chute wall, one or more door flaps, a flange surrounding the door area, and one or more hinge members or areas connecting the door flap(s) to the outer wall and flange.

A typical passenger air bag door is designed to transfer airbag pressure loading created by the expanding air bag onto the tear seam to release the door as quickly as possible during a deployment. A clean and quick separation of the tear seam helps avoid material fragmentation during airbag deployment. A stiffer door can transfer the airbag loading to the tear seam quicker than a more flexible door, and results in less risk of fragmentation. Thus, one of the challenges in passenger air bag door design is to develop a chute and door system wherein the door has enough stiffness to effectively transfer the airbag deployment force to the tear seam while keeping both production costs and weight low.

For optimum protection of a passenger, the passenger-side air bag door is placed in or near the top surface of the instrument panel which results in the door being close to the front windshield of the vehicle. Consequently, impingement of the door against the windshield as it swings open during deployment of the air bag becomes a potential pitfall because the windshield could be damaged. Vehicle styling trends and a desire for improved aerodynamics often result in the slant (i.e., layback angle) of the windshield being increased and the front-to-back depth of the instrument panel being shortened. In addition, passenger air bags are becoming increasingly large and powerful, which raises the minimum required door size for accommodating deployment of the air bag. Consequently, the potential swing area of the air bag door becomes more likely to intersect with the windshield and with a greater force. Use of a stiff door to facilitate opening of the tear seam can result in an increased possibility of damage to the windshield. It would be desirable to reduce the impact force applied when the door contacts the windshield while maintaining sufficient stiffness in the door for proper separation of the tear seam.

U.S. Pat. No. 7,594,674 discloses a deployment door with one or more reduced thickness portions (channels) extending laterally in an inside surface of the door. The reduced thickness portions act as a bend initiator to weaken the door and cause the door to collapse upon contact with the windshield. However, the placement of the channels results in undesirable loss of stiffness during opening of the door, especially when the channels are formed with sufficient size to provide adequate bending when contacting the windshield. Therefore, the deployment door in U.S. Pat. No. 7,594,674 cannot simultaneously maintain good stiffness in the door for proper separation of the tear seam while significantly reducing the impact force applied to the windshield.

SUMMARY OF THE INVENTION

In one aspect of the invention, an instrument panel for a passenger compartment of an automotive vehicle comprises a substrate and a skin covering the substrate. The substrate has inner and outer surfaces, and is adapted to be mounted in the passenger compartment adjacent to a passenger seat and a windshield. The inner surface is adapted to receive an air bag chute assembly for deploying an air bag. The inner surface is inscribed by a door groove defining a deployment door at least partially tearing open to expel the air bag. The outer surface is inscribed by a first hinge groove following a first chord path bisecting the outer surface of the deployment door and configured to bend in response to an edge of the deployment door impacting the windshield.

BRIEF DESCRIPTION OF THE DRAWINGS

FIGS. 9A and 9B are cross-sectional views of a prior art deployment door with a hinge groove scored into an inner surface, wherein FIG. 9A shows an original molded state and FIG. 9B shows a bent state during air bag deployment.

FIGS. 10A and 10B are cross-sectional views of a deployment door of the invention with a hinge groove scored into an outer surface, wherein FIG. 10A shows an original molded state and FIG. 10B shows a bent state during air bag deployment.

DETAILED DESCRIPTION OF PREFERRED EMBODIMENTS

Figure 1:
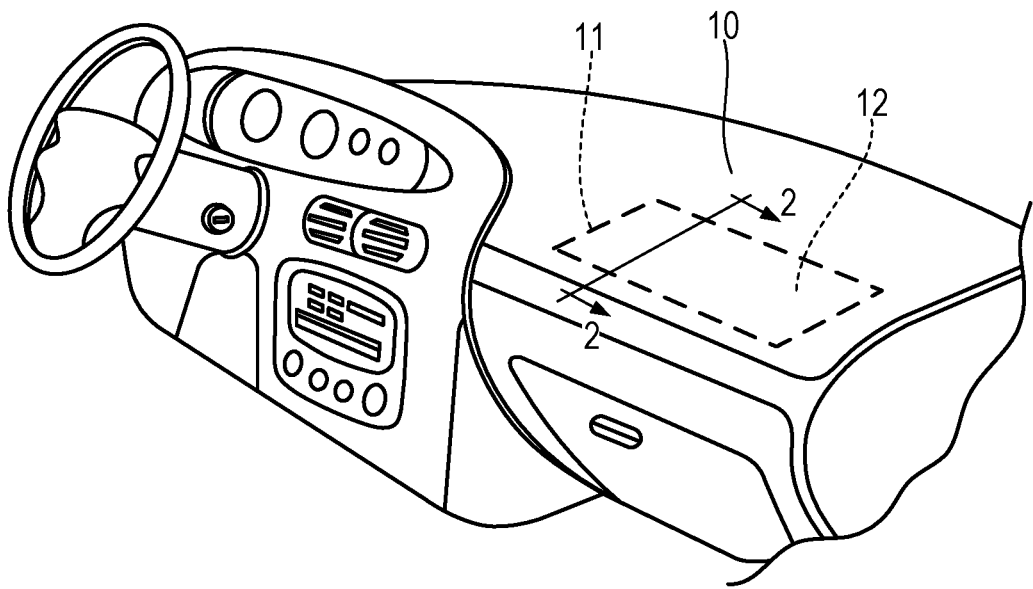
FIG. 1 is a perspective view of an automotive instrument panel system showing a passenger air bag deployment area.
Figure 2:
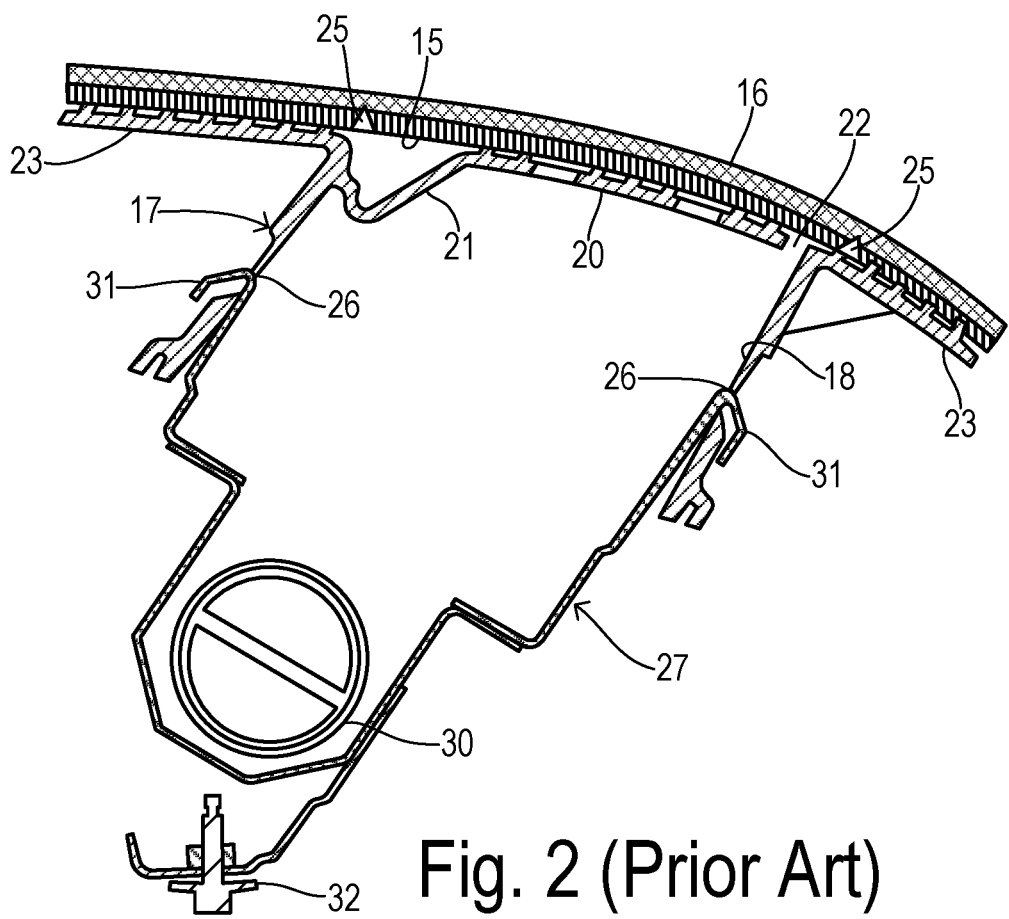
FIG. 2 is a cross-sectional view along line 2-2 of FIG. 1 showing one type of conventional passenger air bag system.
Figure 3:
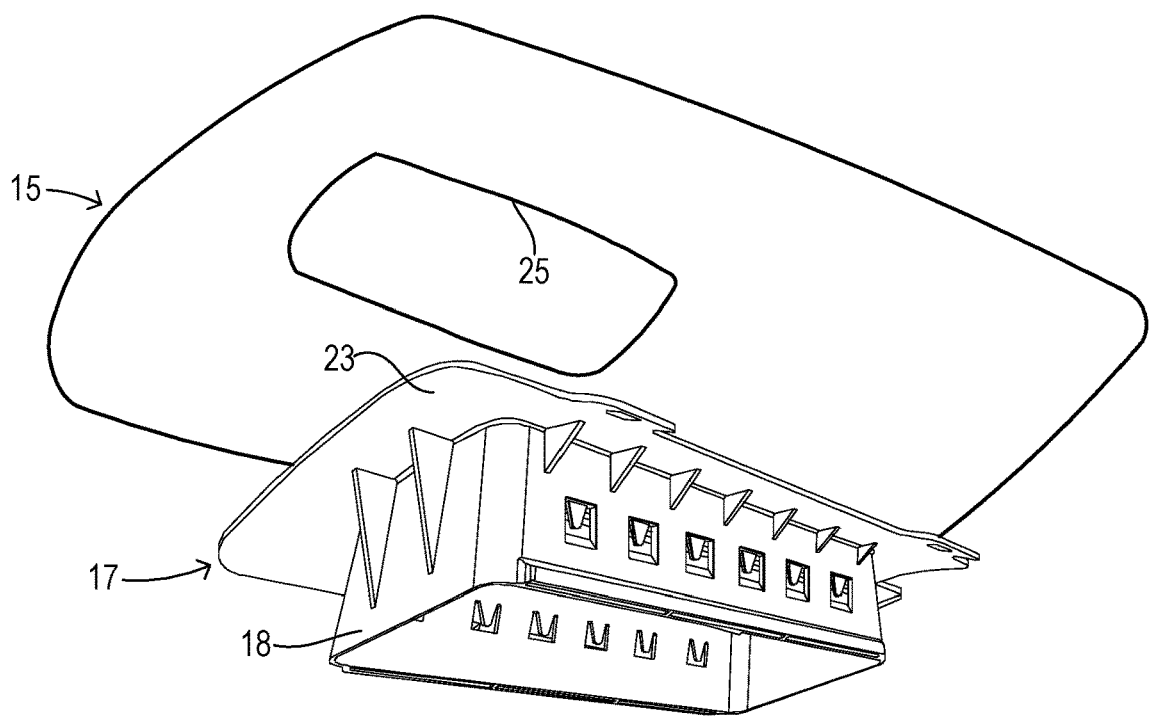
FIG. 3 is an exploded, perspective view of the air bag chute and inner surface of an instrument panel substrate.

Referring now to FIGS. 1-3, an instrument panel 10 includes a passenger air bag system with a hidden seam 11 defining a deployment door area 12. An instrument panel substrate 15 provides the desired shape and rigidity for the instrument panel. It is overlaid by a cover layer 16 which may include a conventional elastomeric skin and a layer of foam between the skin and substrate 15. A chute 17 includes a tubular passageway 18 and a deployment door flap 20 at the upper end thereof. Deployment door 20 is coupled to passageway 18 by a hinge 21 along one side. A gap 22 may define an outer edge on three sides of door flap 20, for example. Instead of a gap, a pre-weakened seam may define the door aperture which opens only after being severed during deployment. Chute 17 includes a flange (collar) 23 surrounding door 20. Flange 23 and door flap 20 can have a plurality of welding ribs for welding chute 17 to instrument panel substrate 15.

As shown in FIG. 2, instrument panel substrate 15 and covering layer 16 may include a hidden seam 25 for tearing during opening of deployment door 20. Seam 25 defines a door aperture which may be formed by mechanical or laser scoring prior to attachment of chute 17. An air bag module 27 is mounted to a plurality of holes 26 in chute passageway 18. Air bag module 27 is comprised of a rigid box containing a propellant source 30 and a folded bag (not shown) that is guided along a deployment path defined by passageway 18 to door 20 upon inflation by gases from propellant source 30. Air bag module 27 includes a plurality of hooks 31 that are received in a corresponding plurality of windows 26. A fastener 32 couples air bag module 27 to a cross-car beam via a bracket (not shown).

As seen in FIG. 3, hidden seam 25 is inscribed as a door groove defining the substrate portion of the deployment door and typically following a generally rectangular, closed path. Seam 25 has a groove depth selected to provide a desired stability during normal use and to provide desirable tearing/deployment performance, as known in the art. For obtaining a desired strength and appearance, instrument panel substrate 15 and chute assembly 17 may preferably be formed of moldable thermoplastic materials, such as acrylonitrile butadiene styrene (ABS), polyolefin (TPO), thermoplastic elastomers (TPE), and thermoplastic elastomer olefin (TEO).

Figure 4:
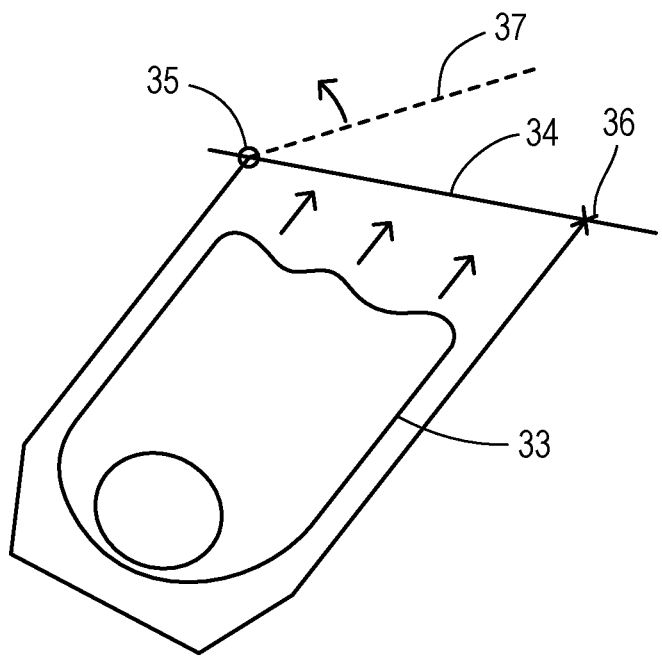
FIG. 4 is a diagram showing an air bag expansion and resulting pivoting movement of a door after tearing of a door seam.

FIG. 4 depicts the action of an expanding air bag 33 to impact an air bag deployment door 34 (including corresponding portions of the substrate and the door flap of the chute assembly) between a hinge 35 and a tear seam 36. After the impact force of bag 33 succeeds in separating tear seam 36, door 34 pivots around hinge 35 to an open position 37 so that air bag 33 emerges to provide a passenger restraint.

Figure 5:
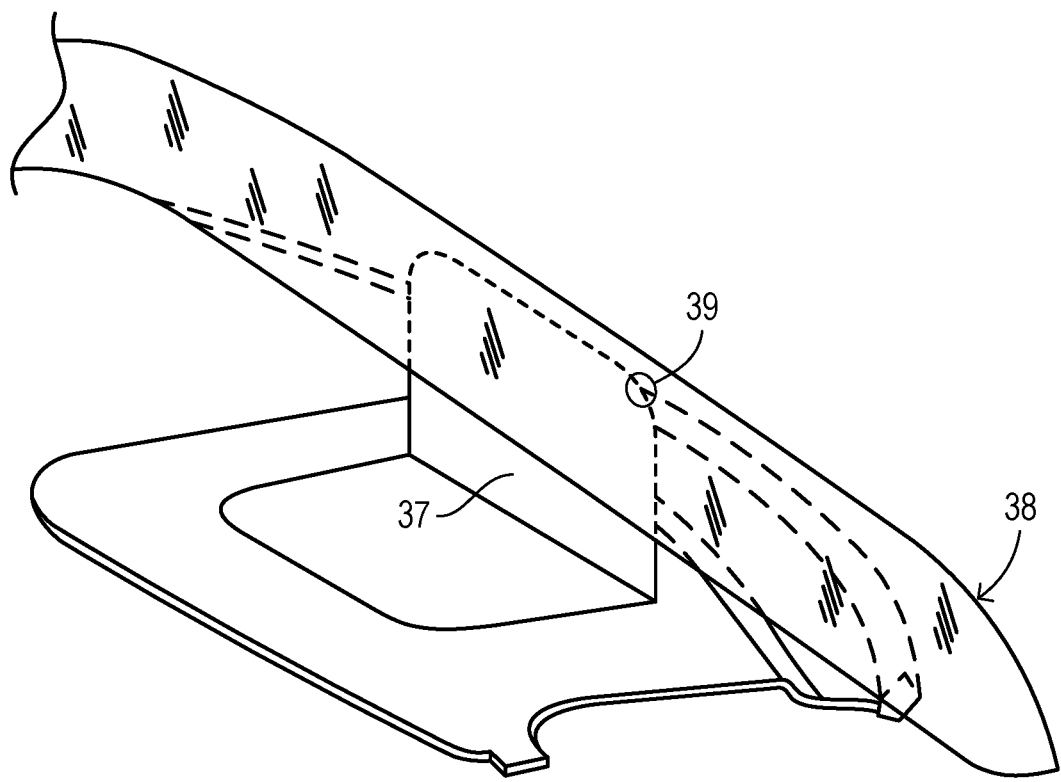
FIG. 5 is a perspective view showing an open deployment door in contact with a windshield.

Depending upon the configuration of an instrument panel, deployment door and proximity to the windshield, a sweep range of the deployment door can often overlap with the windshield so that an impact of the door against the windshield during air bag deployment occurs. For example, FIG. 5 shows a portion of a front passenger side of a vehicle, wherein a hidden door 37 has opened and pivots through its sweep range toward a windshield 38. Due to the curvature of windshield 38, an outside corner of door 37 may impact windshield 38 at a nearest point 39 where the sweep range is most likely to overlap the windshield.

Figure 6:
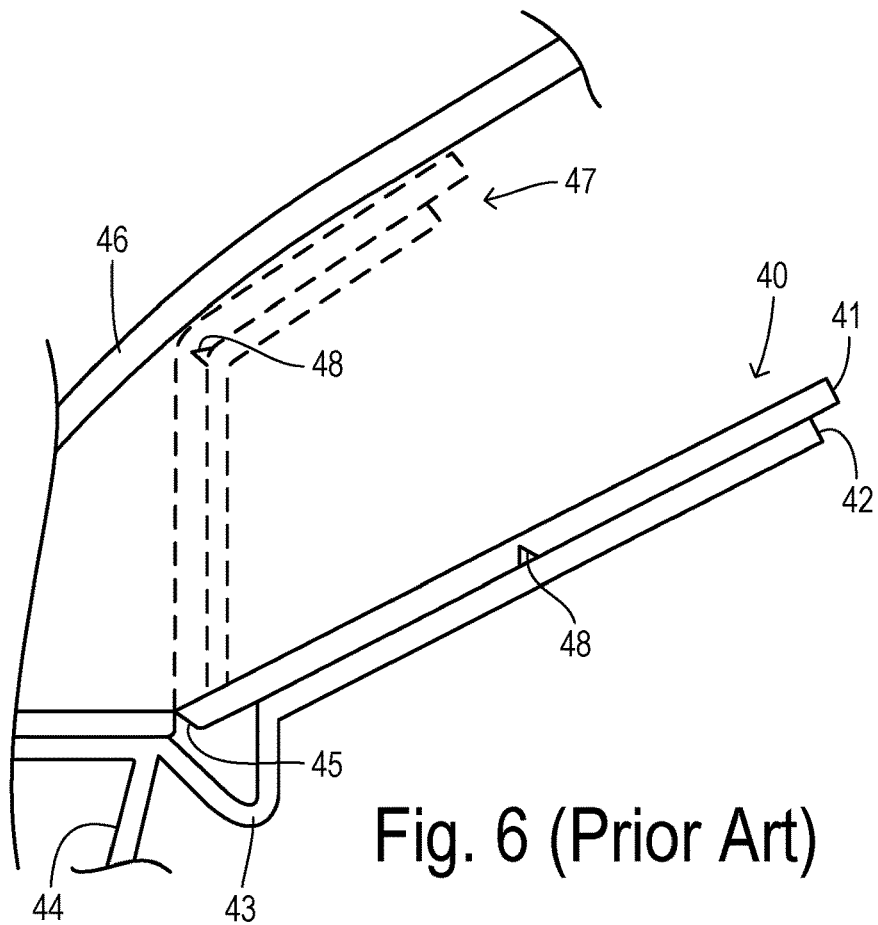
FIG. 6 is a cross-sectional view of a prior art deployment door with inner channels providing a bend initiator when contacting the windshield.

FIG. 6 shows a deployment door 40 with an outer substrate portion 41 and an inner door flap 42. Flap 42 is connected via a hinge 43 to a main chute passageway 44. Door 40 is shown at a partially open position by solid lines, wherein tear seam 45 of substrate 41 has been opened by inflation of an airbag (not shown). Substrate portion 41 of door 40 has a channel or score line 48 cut into an inner surface to act as a band initiator. Dashed lines show door 40 at a fully open position 47 wherein a windshield 45 has been impacted by door 40. As a result of the impact, a bending of door 40 has occurred along score line 48. For several reasons, however, the placement of score line 48 on an inner surface of substrate 41 results in decreased performance with regard to tearing open of door 40. Score line 48 is on the side of substrate 41 receiving the expanding airbag, whereby a significant deformation can occur in response to the air bag force, which delays tearing open of the door and may cause asymmetries in the tearing.

Figure 7:
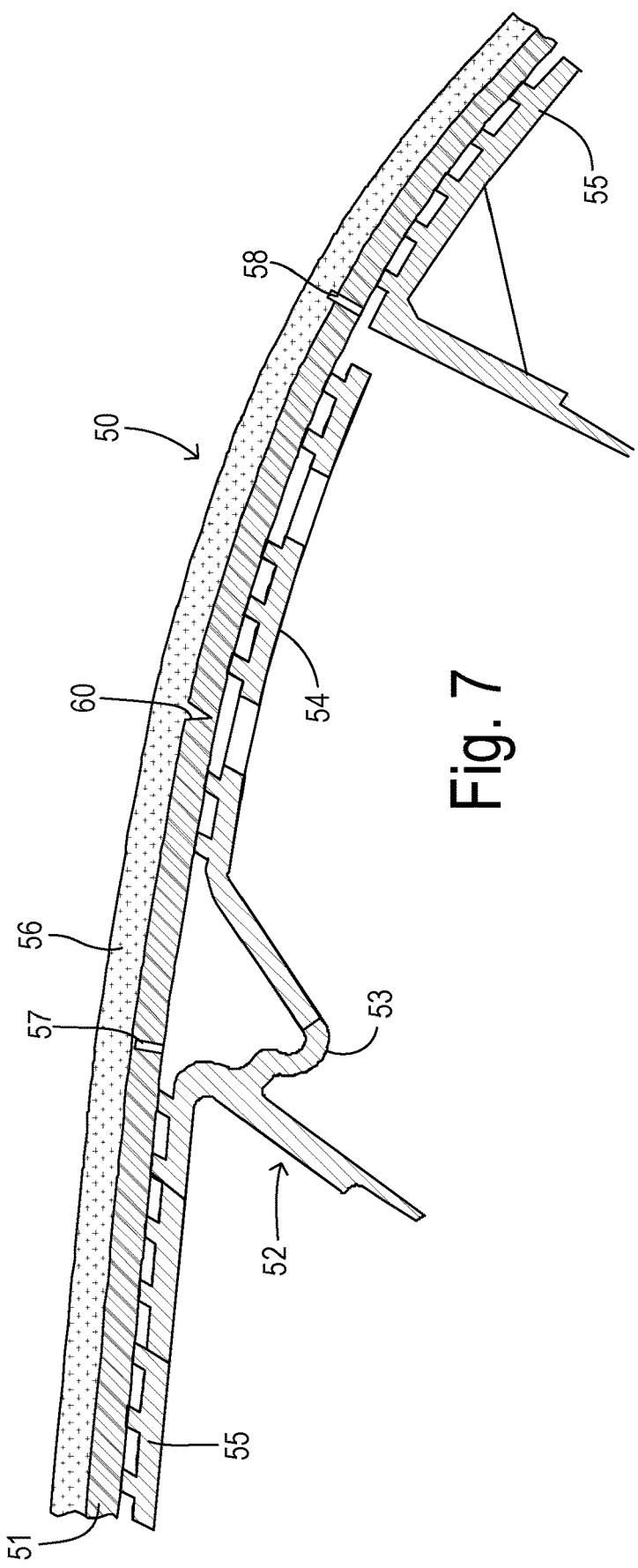
FIG. 7 is a cross-sectional view of an instrument panel assembly with a hinge groove in an outer surface of a substrate according to an embodiment of the invention.

The present invention instead utilizes a hinge groove on an outer door surface as shown in FIG. 7. An instrument panel system 50 includes a substrate 51 and a chute assembly 52. Chute assembly 52 includes a hinge 53, a door flap 54, and an attachment flange 55. Chute assembly 52 is mounted to an inner surface of substrate 51. A skin or trim covering 56 is affixed to the outer surface of substrate 51. Substrate 51 has tear seams 57 and 58 inscribed into the inner surface (via molding or scoring). As shown by seam 58, the seam opening can extend into an inner surface of skin covering layer 56.

The outer surface of substrate 51 is inscribed by a hinge groove 60 which bisects the outer surface of the deployment door and is configured to bend in response to impact against the windshield. Since hinge groove 50 is located on the outside surface, away from the inflating air bag, less deformation of the deployment door occurs in response to tearing forces exerted by the inflating airbag as compared to the prior art. Depending upon the type of material utilized as covering layer 56, the material of layer 56 may or may not infuse groove 60.

Figure 8:
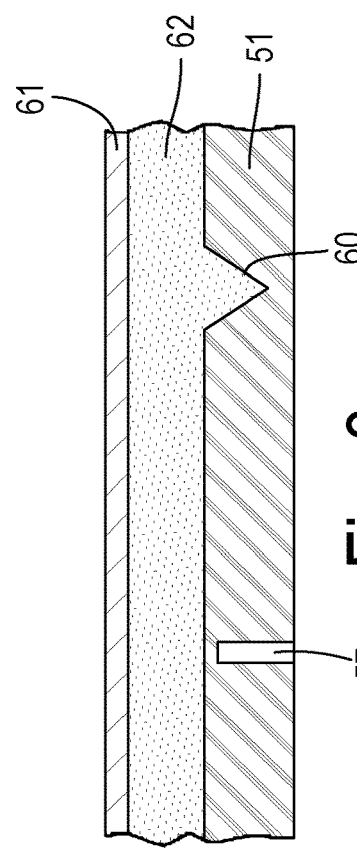
FIG. 8 is cross-sectional view of a preferred embodiment of an inscribed substrate covered by a skin and foam layer.

FIG. 8 shows one preferred type of covering layer wherein a skin layer such as leather or a simulated fabric or faux leather material provides a Class A surface presented to the vehicle occupants and which is supported by a foam layer 62 injected between skin and 61 and substrate 51.

Figure 9A:
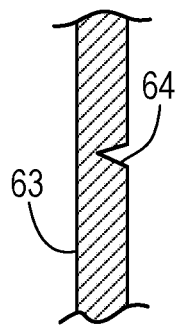
Figure 9B:
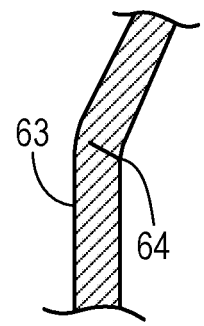
Figure 10A:
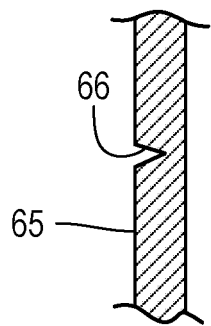
Figure 10B:
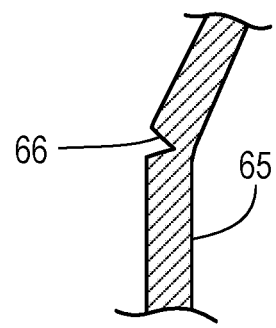

FIG. 9A shows a prior art deployment door substrate 63 having a hinge seam 64 inscribed on an inner surface. As shown in FIG. 9B, when prior art door substrate 63 bends in response to loading against the windshield, the degree of bending is limited by the size and shape of seam 64 (since the gap within seam 64 closes up). In other words, in order to obtain significant degree of bending, a relatively larger seam width and/or seam depth is necessary. However, increases in the seam dimensions may drastically reduce door stiffness and have a negative impact on door deployment. In contrast, FIG. 10A shows a substrate deployment door 65 having a hinge groove 66 inscribed into an outer surface according to the invention. During bending under influence of the windshield as shown in FIG. 6B, groove 66 expands instead of contracting. Consequently, a greater degree of bending can be obtained without large increases in the seam dimensions. Therefore, initial tearing of the door seam does not become compromised.

The shape, size, and placement geometry of the hinge can be adjusted to obtain optimized performance. The hinge groove can be fine-tuned to ensure airbag deployment is not compromised while being able to bend when impacting the windshield. For example, hinge stiffness can be controlled by the depth of the scoring into the Class A (i.e., outer) surface of the door, while the overall passenger air bag (PAB) door stiffness is influenced by geometric placement of the hinge. CAE can be utilized to determine beneficial locations to put one or more hinge grooves.

Figure 11:
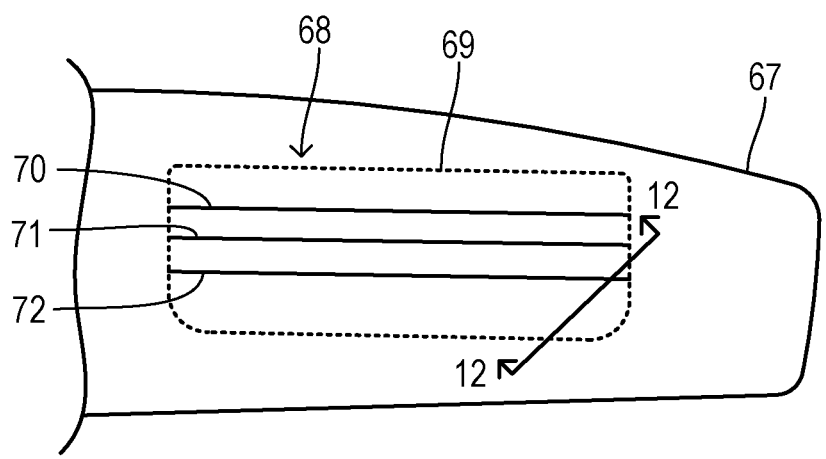
FIG. 11 is a top view of an instrument panel showing various potential locations for chord paths of outer hinge grooves.
Figure 12:
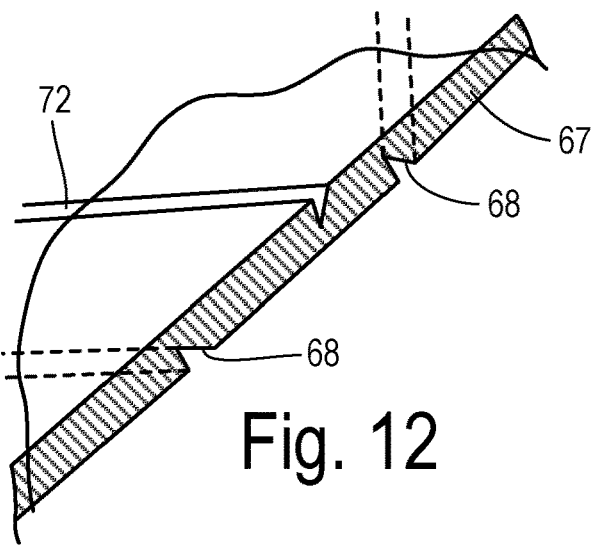
FIG. 12 is a cross section of the instrument panel along line 12-12 of FIG. 11.

FIG. 11 shows several hinge placements for a comparative analysis. An instrument panel substrate 67 has a deployment door defined by a door groove 68 scored into its inner (Class B) surface. Door groove 68 provides a closed door perimeter which may be generally rectangular and which defines a corresponding door shape on the outer (Class A) surface seen in FIG. 11. A pivot edge 69 corresponds to a pivot side of the door (i.e., the main hinge for door opening, opposite from the edges of the door that may impact the windshield). The cross section of FIG. 12 shows the inner scoring of door groove 68 into substrate 67 and the outer scoring of a hinge groove 72.

In FIG. 11, each potential hinge groove inscribed into the outer surface for bending of the door panel upon impacting the windshield is configured along a chord path extending between two points on the door perimeter, thereby bisecting the door. Three possible locations for chord paths (i.e., hinge lines) which are parallel with edge 69 are shown as a rear hinge line 70, middle hinge line 71, and front hinge line 72. In one particular PAB system design used for CAE analysis, scoring depth was investigated for up to 60% of the base thickness at each of the chord path locations. In this particular example, optimal results were obtained for the rear hinge line 70 such that the impact force on the windshield was reduced by about 50% and the stress level to the windshield was reduced by about 33%. The tearing open of the deployment door (e.g., length of time required for opening and the evenness of the tearing) were substantially unaffected.

Figure 13:
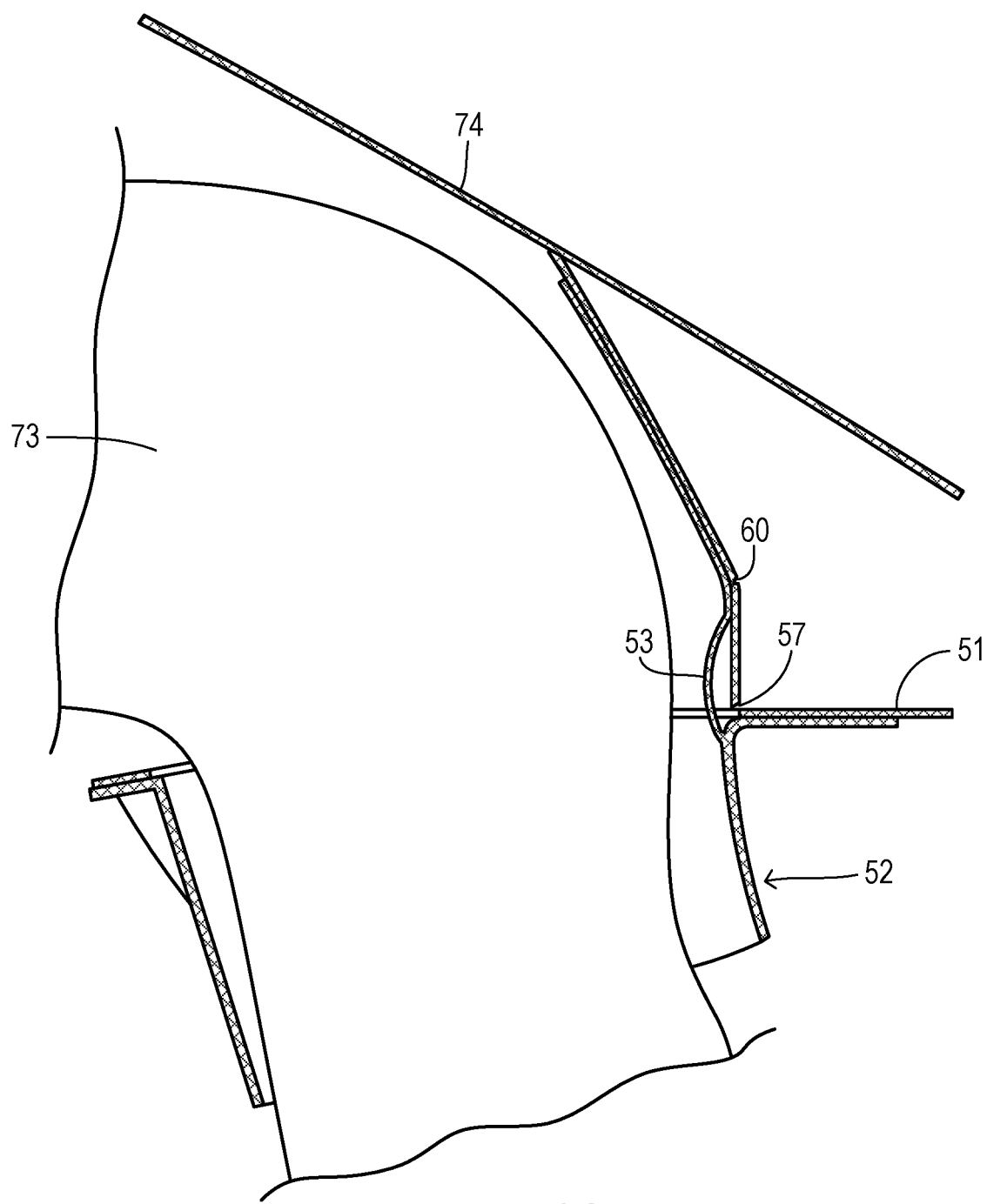
FIG. 13 is a cross-sectional view of an air bag deployed through the substrate and chute assembly with the deployment door in contact with the windshield.

FIG. 13 shows the bending of hinge groove 60 upon impacting of the deployment door with a windshield 74 in response to inflation of an air bag 73. Tear seam 57 may or may not fully separate. When it does, hinge 53 of chute assembly 52 retains the deployment door portion of substrate 51 in a manner that constraints the sweep range of the door and keeps all the torn pieces tethered. As shown, the optimal locations for a hinge groove may be at a location where it remains spaced away from windshield 74 during impact.

Figure 14:
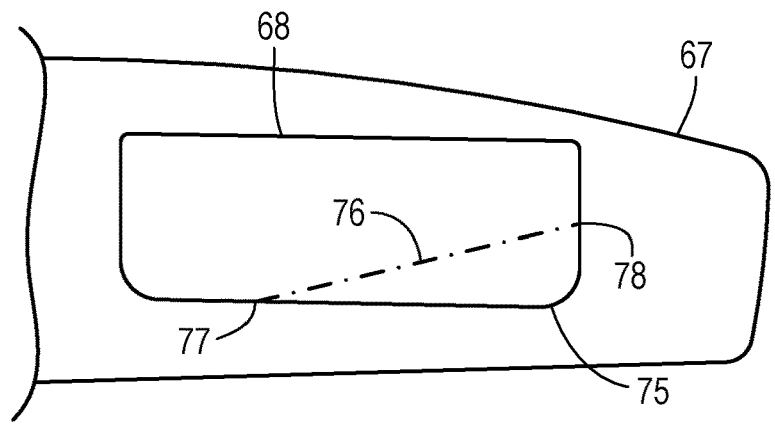
FIG. 14 is a top view of the instrument panel showing another chord path locations for an outer hinge groove.

Depending on the size and layout of the deployment door in the substrate and the relative location of the windshield, the sweep range of the deployment door determines which point along the edge of the door first impacts the windshield. As shown in FIG. 14, door profile 68 defines a first contact cusp 75 along the door edge. For best performance, bending of the door upon impacting the windshield is along a chord path that spans the contact cusp. Thus, a hinge groove is inscribed (e.g., scored) along a chord path 76 between points 77 and 78 that span cusp 75.

Figure 15:
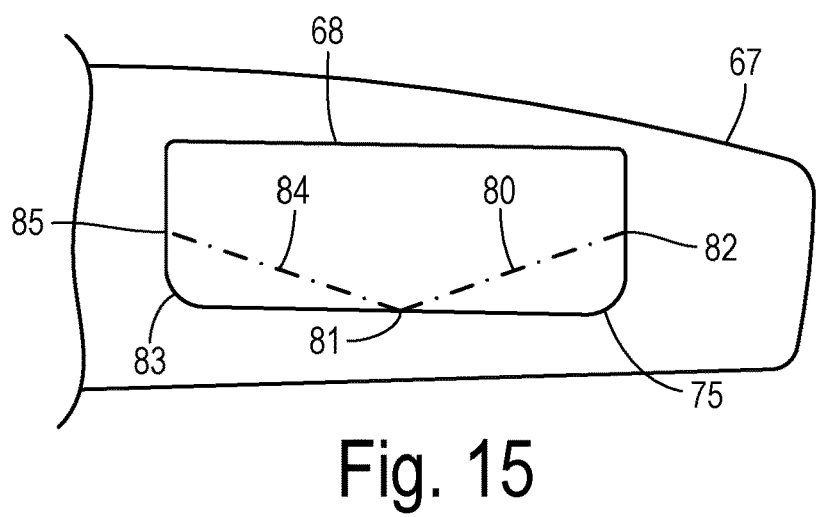
FIG. 15 is a top view of the instrument panel showing a pair of serial chord paths for outer hinge grooves.

After the deployment door begins to bend as a result of the impact of a first contact cusp, further pivoting of the door may result in subsequent impact of another portion of the door edge against the windshield. A second hinge groove can be introduced to respond to a second contact as shown in FIG. 15. Thus, door profile 68 defines first contact cusp 75 and a second contact cusp 83. A hinge groove is inscribed (e.g., in-molded) along a chord path 80 between points 81 and 82 that span cusp 75, and another hinge groove is inscribed along a chord path 84 between points 81 and 85 that span cusp 83.

Figure 16:
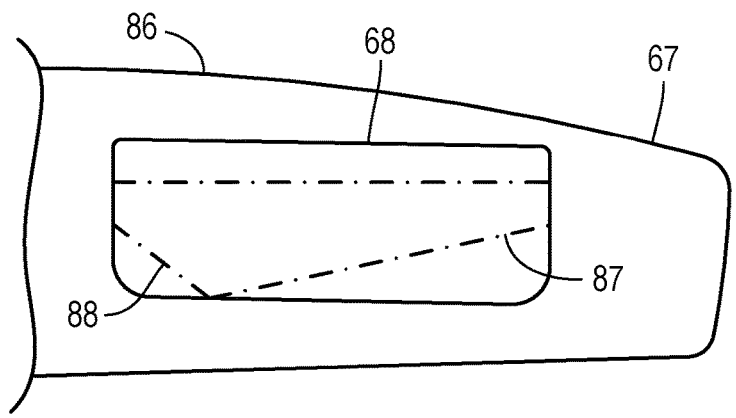
FIG. 16 is top view of the instrument panel showing a plurality of chord path locations for outer hinge grooves.

Hinge grooves responsive to the specific contact cusps can be combined with a main hinge groove which is parallel with the main door hinge. As shown in FIG. 16, chord paths 86, 87, and 88 can be used to tailor the response of the door during impact with the windshield to best reduce and distribute the stress experienced by the windshield.

Figure 17:
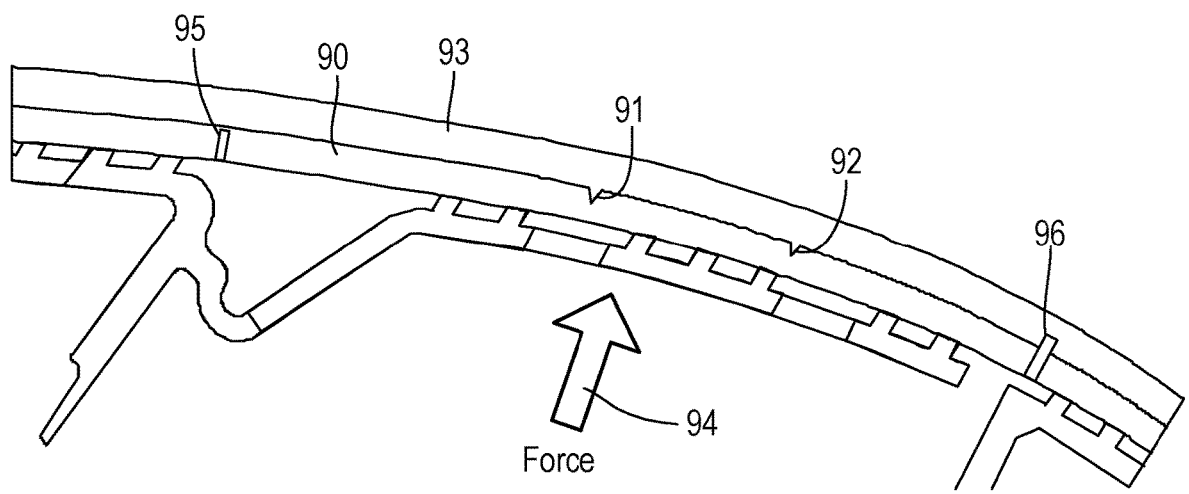
FIG. 17 is a cross section of the instrument panel assembly of the invention with multiple outer hinge grooves and showing an expansion force of an inflating air bag for tearing open the deployment door.

FIG. 17 shows a deployment door 90 having hinge grooves 91 and 92 inscribed on its outer surface. A skin 93 covers the outer surface and hides hinge grooves 91 and 92 from view. When a force 94 is generated by an inflating air bag, door 90 is torn open along tear seams 95 and 96. Since hinge grooves 91 and 92 are on the opposite side of door 90 from the side that receives the force, and since the locations for hinge grooves 91 and 92 can be adjusted in a way that considers the opening forces, the required bending performance during windshield impact can be obtained without negatively affecting the responsiveness to tearing force 94.

What is claimed is:

1. An automotive vehicle having a passenger compartment, comprising:
   an instrument panel substrate mounted in the passenger compartment with an inner surface and an outer surface wherein the inner surface is inscribed by a door groove defining a deployment door at least partially tearing open to expel an inflating air bag;
   a tubular chute with an outer flange attached to the instrument panel around the deployment door and extending interiorly from the flange to a lower end configured to receive an air bag module; and
   a windshield adjacent the substrate within a sweep range of the deployment door;
   wherein the outer surface of the substrate is inscribed by a first hinge groove following a first chord path bisecting the outer surface of the deployment door and configured to bend in response to an edge of the deployment door impacting the windshield.

2. The vehicle of claim 1 wherein the sweep range of the deployment door determines a first contact cusp on the edge of the deployment door impacting the windshield, and wherein the first chord path spans the first contact cusp.

3. The vehicle of claim 2 wherein the outer surface of the substrate is inscribed by a second hinge groove following a second chord path bisecting the outer surface of the deployment door, wherein continued opening of the deployment door after the first contact cusp impacts the windshield results in a second contact cusp impacting the windshield, and wherein the second chord path spans the second contact cusp.

4. The vehicle of claim 2 wherein the outer surface of the substrate is inscribed by a plurality of hinge grooves each following a respective chord path bisecting the outer surface of the deployment door and spanning the first contact cusp.

5. The vehicle of claim 1 further comprising a skin covering the outer surface of the substrate and hiding the hinge groove from view.

6. The vehicle of claim 1 further comprising:
a skin covering the outer surface of the substrate and hiding the hinge groove from view; and
a foam layer disposed between the skin and the substrate.

7. The vehicle of claim 1 wherein the substrate is comprised of a molded thermoplastic, and wherein the first hinge groove is scored into the outer surface of the substrate.

8. An instrument panel for a passenger compartment of an automotive vehicle, comprising:
a substrate with an inner surface and an outer surface, wherein the substrate is adapted to be mounted in the passenger compartment adjacent to a passenger seat and a windshield, and wherein the inner surface is adapted to receive an air bag chute assembly for deploying an air bag; and
a skin covering the outer surface;
wherein the inner surface is inscribed by a door groove defining a deployment door at least partially tearing open to expel the air bag; and
wherein the outer surface is inscribed by a first hinge groove following a first chord path bisecting the outer surface of the deployment door and configured to bend in response to an edge of the deployment door impacting the windshield.

9. The instrument panel of claim 8 wherein the deployment door has a sweep range which determines a first contact cusp on the edge of the deployment door impacting the windshield, and wherein the first chord path spans the first contact cusp.

10. The instrument panel of claim 9 wherein the outer surface of the substrate is inscribed by a second hinge groove following a second chord path bisecting the outer surface of the deployment door, wherein continued opening of the deployment door after the first contact cusp impacts the windshield results in a second contact cusp impacting the windshield, and wherein the second chord path spans the second contact cusp.

11. The instrument panel of claim 9 wherein the outer surface of the substrate is inscribed by a plurality of hinge grooves each following a respective chord path bisecting the outer surface of the deployment door and spanning the first contact cusp.

12. The instrument panel of claim 8 further comprising:
a foam layer disposed between the skin and the substrate.

13. The instrument panel of claim 8 wherein the substrate is comprised of a molded thermoplastic, and wherein the first hinge groove is scored into the outer surface of the substrate.

* * * * *